(12) United States Patent
Parsell

(10) Patent No.: US 12,449,060 B2
(45) Date of Patent: Oct. 21, 2025

(54) LEVERING TOOL ASSEMBLY AND METHOD OF USE

(71) Applicant: Larry Parsell, Jerseyville, IL (US)

(72) Inventor: Larry Parsell, Jerseyville, IL (US)

( * ) Notice: Subject to any disclaimer, the term of this patent is extended or adjusted under 35 U.S.C. 154(b) by 338 days.

(21) Appl. No.: 18/142,005

(22) Filed: May 1, 2023

(65) Prior Publication Data

US 2024/0369154 A1 Nov. 7, 2024

(51) Int. Cl.
*F16K 31/60* (2006.01)
*B65D 90/54* (2006.01)
*B65G 3/04* (2006.01)

(52) U.S. Cl.
CPC ............ *F16K 31/602* (2013.01); *B65D 90/54* (2013.01); *B65D 2590/662* (2013.01); *B65G 3/04* (2013.01)

(58) Field of Classification Search
CPC .................. B65D 90/10; B65D 90/623; B65G 65/30–489; B66F 15/00; B66F 19/00; B66F 19/005; E05F 11/04; E05F 11/18; E05F 11/20; E05F 11/26; E05F 11/28; E05F 13/02
See application file for complete search history.

(56) References Cited

U.S. PATENT DOCUMENTS

| 6,302,376 B1 * | 10/2001 | Williams .............. E04H 17/265 |
| | | 254/30 |
| 9,359,153 B2 * | 6/2016 | Bahnmiller ............ B65G 65/40 |
| 2020/0307979 A1 * | 10/2020 | Kawell .................... B66F 15/00 |

FOREIGN PATENT DOCUMENTS

| CN | 201650051 | 11/2010 |
| CN | 102424219 | 4/2012 |
| CN | 205623235 | 10/2016 |
| CN | 111872894 | 11/2020 |
| CN | 216376225 | 4/2022 |

* cited by examiner

*Primary Examiner* — Tyrone V Hall, Jr.

(57) ABSTRACT

A levering tool assembly for actuating a pull rod of a sliding door of a sump in a grain bin includes first and second bars, with the second bar extending angularly from the first bar's first end. A coupling module, which is attached to the first bar's second end, is selectively couplable to a pull rod that is operationally engaged to the sliding door. A fulcrum module, which is attached to a bottom of the first bar between the first and second ends, is extensible substantially perpendicularly from the first bar and opposingly to the second bar. With the coupling module coupled to the pull rod and the fulcrum module positioned in abutment with a wall of the grain bin, the second bar is pushed upon by a user to apply a levering force to the pull rod to open the sliding door.

14 Claims, 7 Drawing Sheets

LEVERING TOOL ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lever pulls and more particularly pertains to a new lever pull for actuating a pull rod of a sliding door of a sump in a grain bin. The present invention discloses a lever pull providing a longitudinally directed mechanical advantage in manually actuating a pull rod engaged to a stuck sliding door of a sump in a grain bin.

(2) Description of Related Art Including Information Disclosed Under 37 CFR 1.97 and 1.98

The prior art relates to lever pulls. Chinese Patent No. CN 102424219 a lever pull for use in opening a sliding panel of a cement storage tank. In contrast to the present invention, the lever pull of this reference is pulled, rather than pushed, and it lacks both an adjustable fulcrum module and a coupling module for attachment to a pull rod. U.S. Pat. No. 11,152,164 discloses a pull pin assembly having a rack gear attached to a pull pin, with a crank operated pinion gear engaged to the rack gear. Some newer grain bins come equipped, at additional cost, with motorized rack and pinion assemblies, which are permanently mounted to grain bins and which are configured for actuating pull pins. What is lacking in the prior art is a lever pull that includes an extensible fulcrum module and a coupling module for coupling the lever pull to a pull pin, wherein the pull pin is actuated via pushing on the lever pull and the lever pull can be transported easily between grain bins.

BRIEF SUMMARY OF THE INVENTION

An embodiment of the disclosure meets the needs presented above by generally comprising a first bar and a second bar, with the second bar extending angularly from a first end of the first bar. A coupling module is attached to a second end of the first bar and is configured to selectively couple to a pull rod that is operationally engaged to a sliding door of a sump of a grain bin. A fulcrum module is attached to a bottom of the first bar between the first end and the second end. The fulcrum module is selectively extensible substantially perpendicularly from the first bar and opposingly to the second bar. The fulcrum module, the first bar, and the second bar are coplanar. The coupling module is configured to be coupled to the pull rod and the fulcrum module is configured to be positioned in abutment with a wall of the grain bin. The second bar thus is configured to be grasped and pushed upon by a user to apply a levering force to the pull rod so that the pull rod is pulled and the sliding door is opened.

Another embodiment of the disclosure includes a method of opening a sliding door of a sump of a grain bin. The steps of the method include coupling a coupling module to a pull rod that is operationally engaged to a sliding door of a sump of a grain bin, positioning a fulcrum module in abutment with a wall of the grain bin, and grasping and pushing on a second bar to apply a levering force through a first bar and the coupling module to the pull rod so that the pull rod is pulled and the sliding door is opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
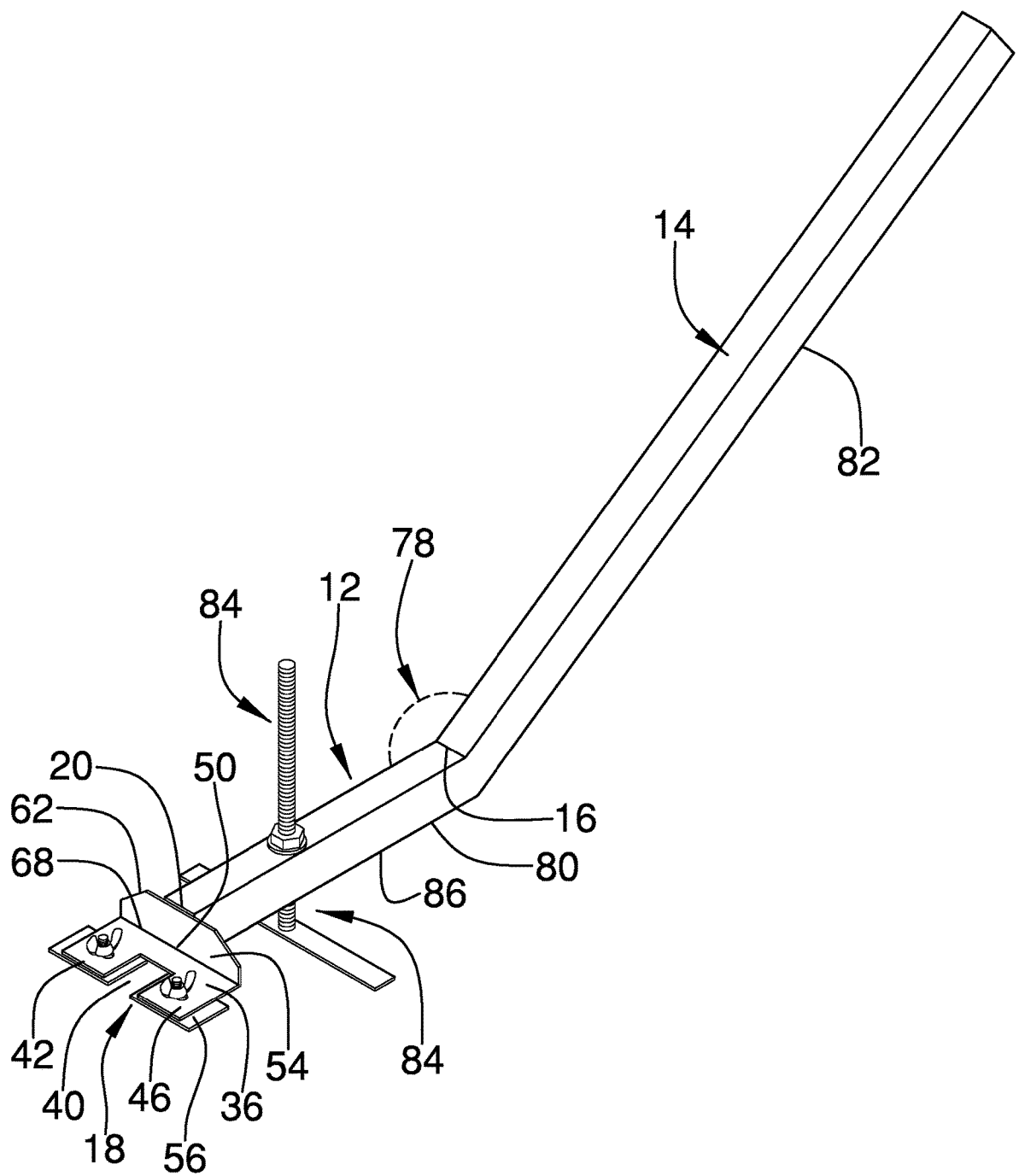
FIG. 1 is an isometric perspective view of a levering tool assembly according to an embodiment of the disclosure.

With reference now to the drawings, and in particular to FIGS. 1 through 7 thereof, a new lever pull embodying the principles and concepts of an embodiment of the disclosure and generally designated by the reference numeral 10 will be described.

Figure 3:
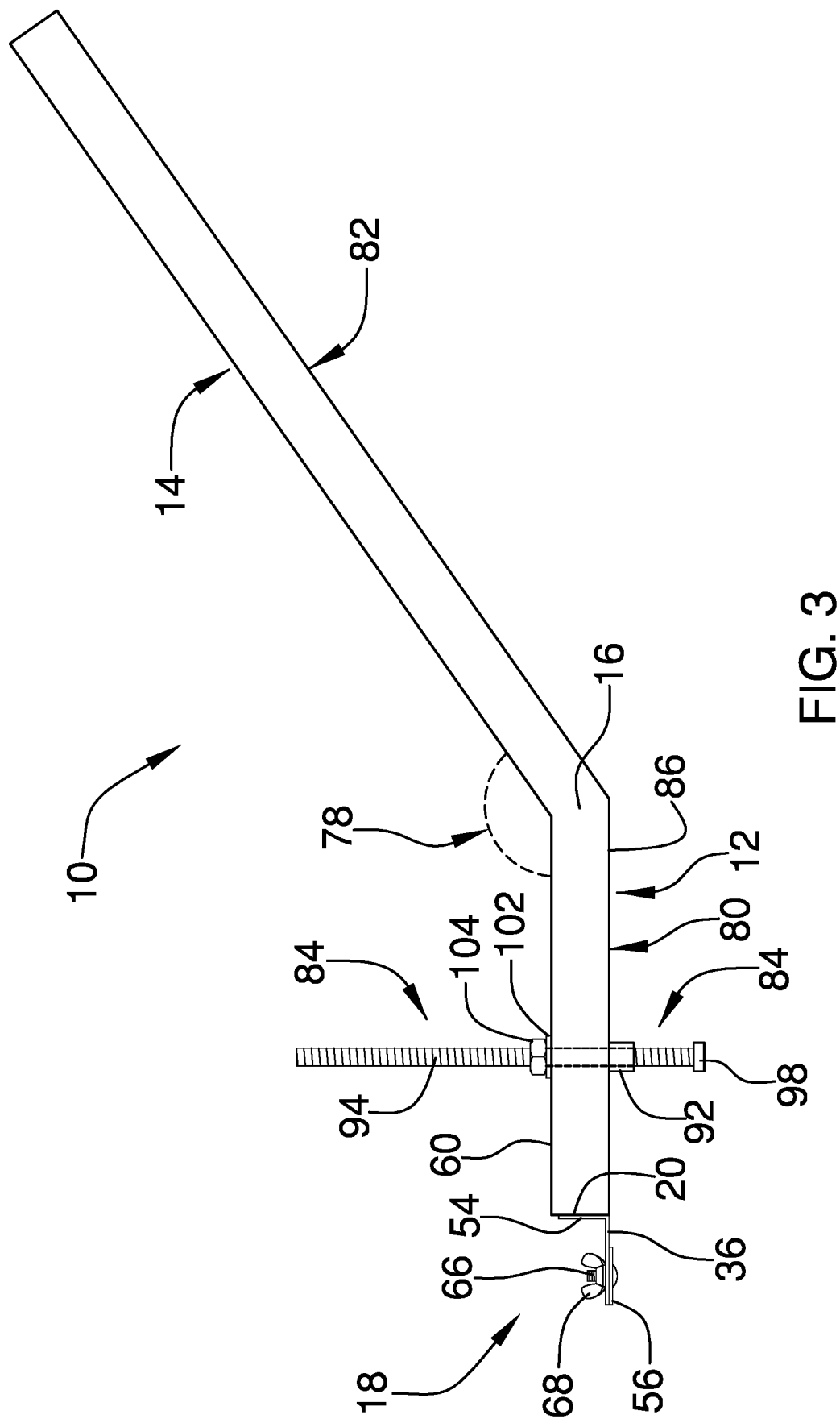
FIG. 3 is a side view of an embodiment of the disclosure.
Figure 4:
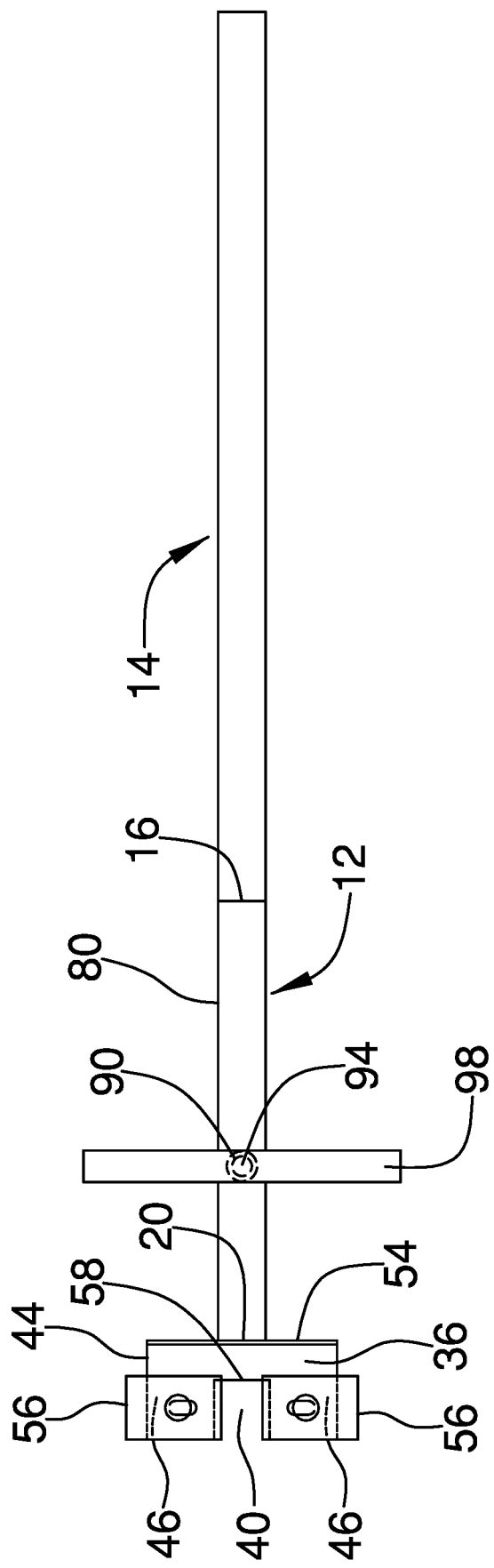
FIG. 4 is a bottom view of an embodiment of the disclosure.
Figure 5:
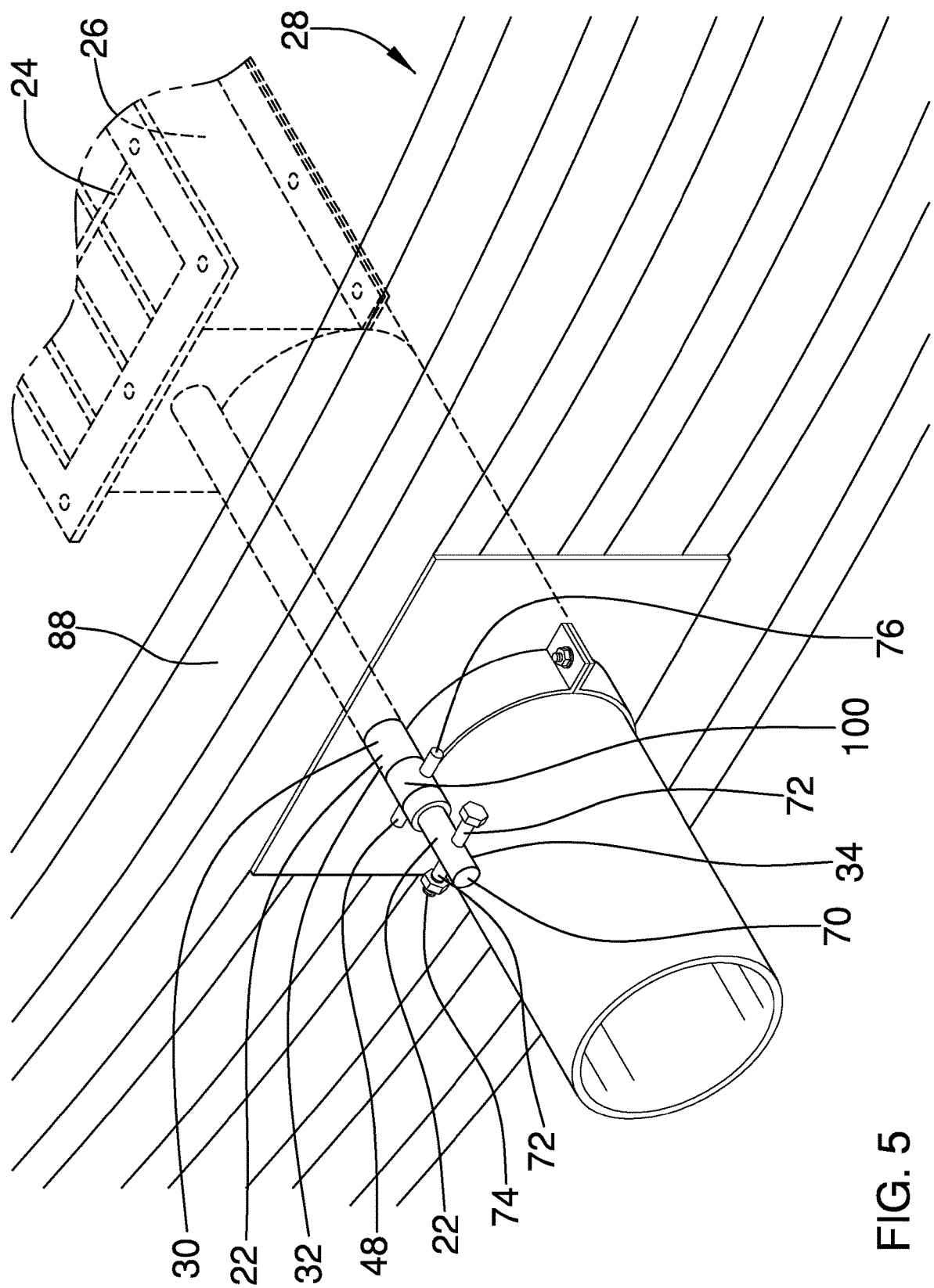
FIG. 5 is a view of pull rod to be actuated by an embodiment of the disclosure.

As best illustrated in FIGS. 1 through 7, the levering tool assembly 10 generally comprises a first bar 12 and a second bar 14, with the second bar 14 extending angularly from a first end 16 of the first bar 12. A coupling module 18 is attached to a second end 20 of the first bar 12 and is configured to selectively couple to a pull rod 22 that is operationally engaged to a sliding door 24 of a sump 26 of a grain bin 28. Pull rod 22, in the context of this disclosure, should be interpreted to mean an operational element engaged to a sliding door 24 of a sump 26 and may comprises rods, pipes, or the like. FIG. 5 shows a secondary pull rod 30, which is configured as a pipe 32, with a primary pull rod 34 being positioned within the pipe 32.

Figure 2:
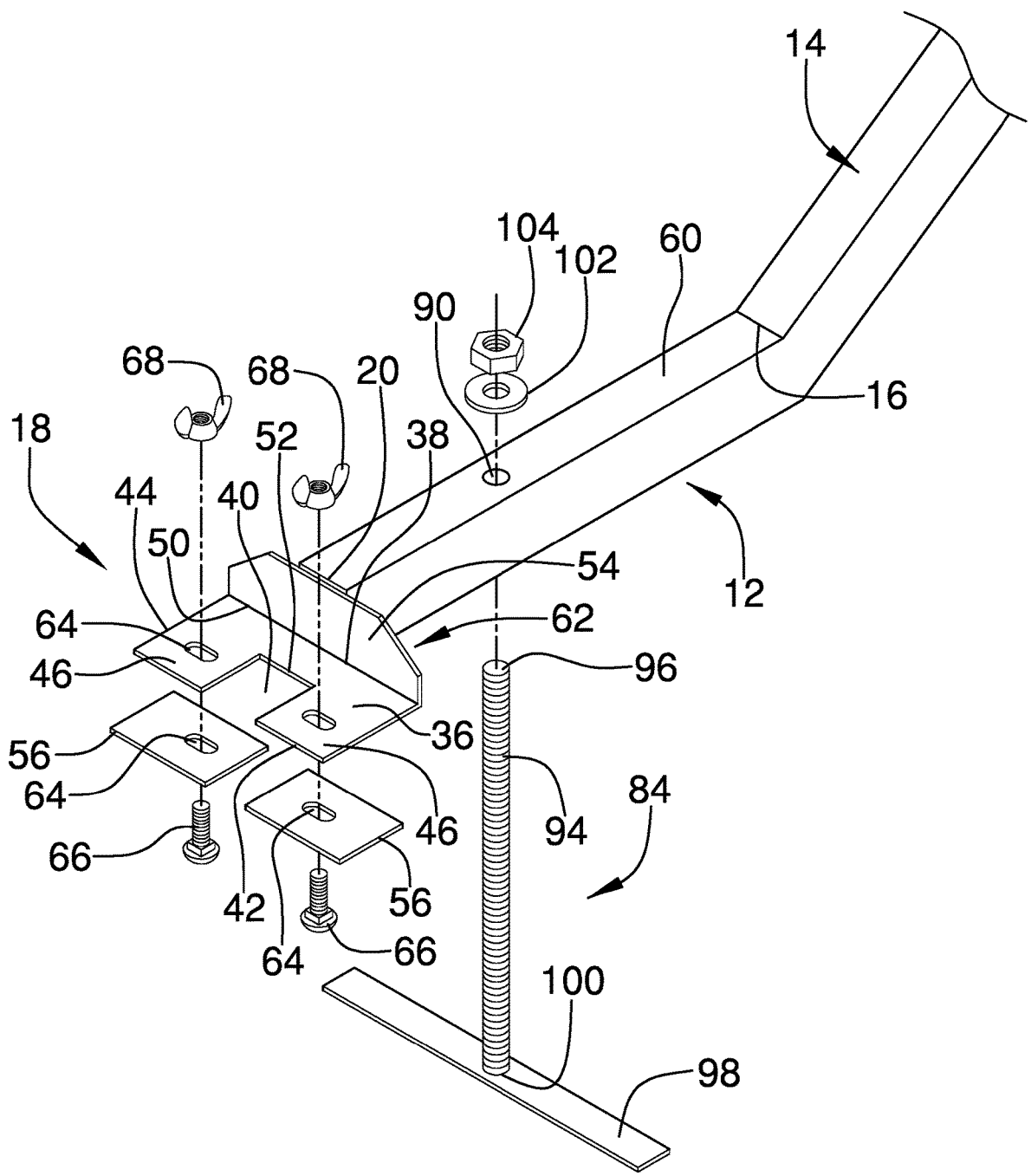
FIG. 2 is an exploded view of an embodiment of the disclosure.

In one configuration, as shown in FIGS. 1 and 2, the coupling module 18 comprises a first plate 36, which is attached by a first edge 38 to the second end 20 of the first bar 12. The first plate 36 extends substantially linearly from the first bar 12 and is dimensionally wider than the first bar 12. A cutout 40 extends into a second edge 42 of the first plate 36 and is positioned equally distant from opposed ends 44 of the first plate 36 so that the cutout 40 defines a pair of tabs 46. The cutout 40 is configured for insertion of the pull rod 22 so that each tab 46 abuts a respective element 48 of a pair of elements 48, the elements 48 of which extend opposingly from the pull rod 22. The first plate 36 has a width 50 of 10.0 to 20.0 cm and the cutout 40 has a width 52 of 3.0 to 6.0 cm. The first plate 36 may have a width 50 of 14.0 to 16.0 cm and the cutout 40 may have a width 52 of 4.0 to 5.0 cm, thereby rendering the coupling module 18 compatible with most configurations used for pull rods 22.

The coupling module 18 also may comprise a second plate 54, which is attached to the first end 16 of the first bar 12, and a pair of spacer plates 56, which are used to adjust an effective width 58 of the cutout 40. The second plate 54 extends from the bottom 86 to a top 60 of the first bar 12 and substantially between the opposed ends 44 of the first plate 36, thereby rigidifying the first plate 36. Upper corners 62 of the second plate 54 may be beveled, as shown in FIG. 2, to reduce a risk of injury to a user.

The slots 64 of a plurality of slots 64 are positioned singly in each tab 46 and in each spacer plate 56. Each bolt 66 of pair of bolts 66 is selectively insertable through a slot 64 positioned in a respective spacer plate 56 and a slot 64 positioned in a respective tab 46. Each wingnut 68 of a pair of wingnuts 68 is selectively threadedly couplable to a respective bolt 66 to secure the pair of spacer plates 56 to the pair of tabs 46. The effective width 58 of the cutout 40 is adjustable by sliding of the spacer plates 56, prior to final tightening of the wingnuts 68, so that the effective width 58 substantially matches a diameter 70 of the pull rod 22. The slots 64 in the spacer plates 56 may be off centered, as shown in FIG. 2, such that flipping of the spacer plates 56 provides for a greater range of adjustment of the effective width 58 of the cutout 40.

The present invention also anticipates the coupling module 18 comprising other coupling means, such as, but not limited to, hooks, clamps, bolts, or the like, depending on how the pull rod 22 is configured. As shown in FIG. 5, the pair of elements 48 comprises two sections 72 of a through bolt 74, which passes through a primary pull rod 34, or a pair of pins 76, which extend from a secondary pull rod 30.

The second bar 14 and the first bar 12 may comprise square tubing, as shown in FIGS. 1-4, or other materials, such as, but not limited to, circular tubing, triangular tubing, solid bars, or the like. The second bar 14 extends from the first bar 12 at an angle 78 of from 120.0° to 160.0°. The second bar 14 may extend from the first bar 12 at an angle 78 of from 140.0° to 150.0°, as is shown in FIG. 3, wherein the second bar 14 extends from the first bar 12 at an angle 78 of 145.0°. Experimentation has shown that a levering tool assembly 10 having the second bar 14 extending from the first bar 12 at an angle 78 of from 145.0° is compatible with a variety of pull rod 22 configurations and provides for application of a levering force to the pull rod 22 in a comfortable position for a user.

The first bar 12 has a length 80 of from 75.0 to 100.0 cm and the second bar 14 has a length 82 of from 31.0 to 43.0 cm. The first bar 12 may have a length 80 of from 80.0 to 90.0 cm and the second bar 14 may have a length 82 of from 35.0 to 39.0 cm. FIGS. 1-4 depicts a levering tool assembly 10 wherein the first bar 12 has a length 80 of 85.1 cm and the second bar 14 has a length 82 of 36.8 cm. The present invention also anticipates the second bar 14 comprising a plurality of nested sections (not shown), thus rending it selectively extensible. As will become apparent, the second bar 14 being selectively extensible would allow a user to selectively increase the levering force applied to the pull rod 22.

A fulcrum module 84 is attached to a bottom 86 of the first bar 12 between the first end 16 and the second end 20. As shown in FIG. 5, the fulcrum module 84 is biased toward the second end 20 of the bar, thereby providing increased leverage. The fulcrum module 84 is selectively extensible substantially perpendicularly from the first bar 12 and opposingly to the second bar 14. The fulcrum module 84, the first bar 12, and the second bar 14 are coplanar, as shown in FIG. 4. The coupling module 18 is configured to be coupled to the pull rod 22 and the fulcrum module 84 is configured to be positioned in abutment with a wall 88 of the grain bin 28. The second bar 14 thus is configured to be grasped and pushed upon by the user to apply the levering force to the pull rod 22 so that the pull rod 22 is pulled and the sliding door 24 is opened.

The fulcrum module 84 being selectively extensible from the first bar 12 allows the levering tool assembly 10 to be configured so that the levering force is applied substantially longitudinally to the pull rod 22. Those skilled in the art of grain bins 28 having sliding doors 24 covering sumps 26 will recognize the benefits of the levering tool assembly 10. The sliding doors 24 are often stuck closed due to infrequent use or from the weight of grain positioned upon them. Users often attempt to actuate pull rods 22 using pliers, vice grips, pipe wrenches, pry bars, or the like, but these devices offer little leverage, apply non-longitudinal forces to the pull rods 22, and are prone to slipping off the pull rods 22.

In one configuration, as shown in FIGS. 2 and 3, the fulcrum module 84 comprise a channel 90, which extends through the first bar 12. A tube 92, which is internally threaded, is attached to the bottom 86 of the first bar 12 and extends from the channel 90. A threaded rod 94 is threadedly inserted through the tube 92 so that an upper end 96 of the threaded rod 94 protrudes from the top 60 of the first bar 12. An elongate plate 98 is attached to a lower end 100 of the threaded rod 94. The elongate plate 98 is selectively positionable relative to the first bar 12 by rotation of the threaded rod 94 within the tube 92. The elongate plate 98 is configured to be positioned in abutment with the wall 88 of the grain bin 28, as shown in FIG. 5.

The fulcrum module 84 also may comprise a washer 102 and a nut 104. The washer 102 is positioned around the threaded rod 94 in abutment with the top 60 of the first bar 12. The nut 104 is threadedly positioned over the upper end 96 of the threaded rod 94. The nut 104 is configured to be selectively tightened to prevent rotation of the threaded rod 94 so that the elongate plate 98 is fixedly positioned relative to the first bar 12.

Figure 6:
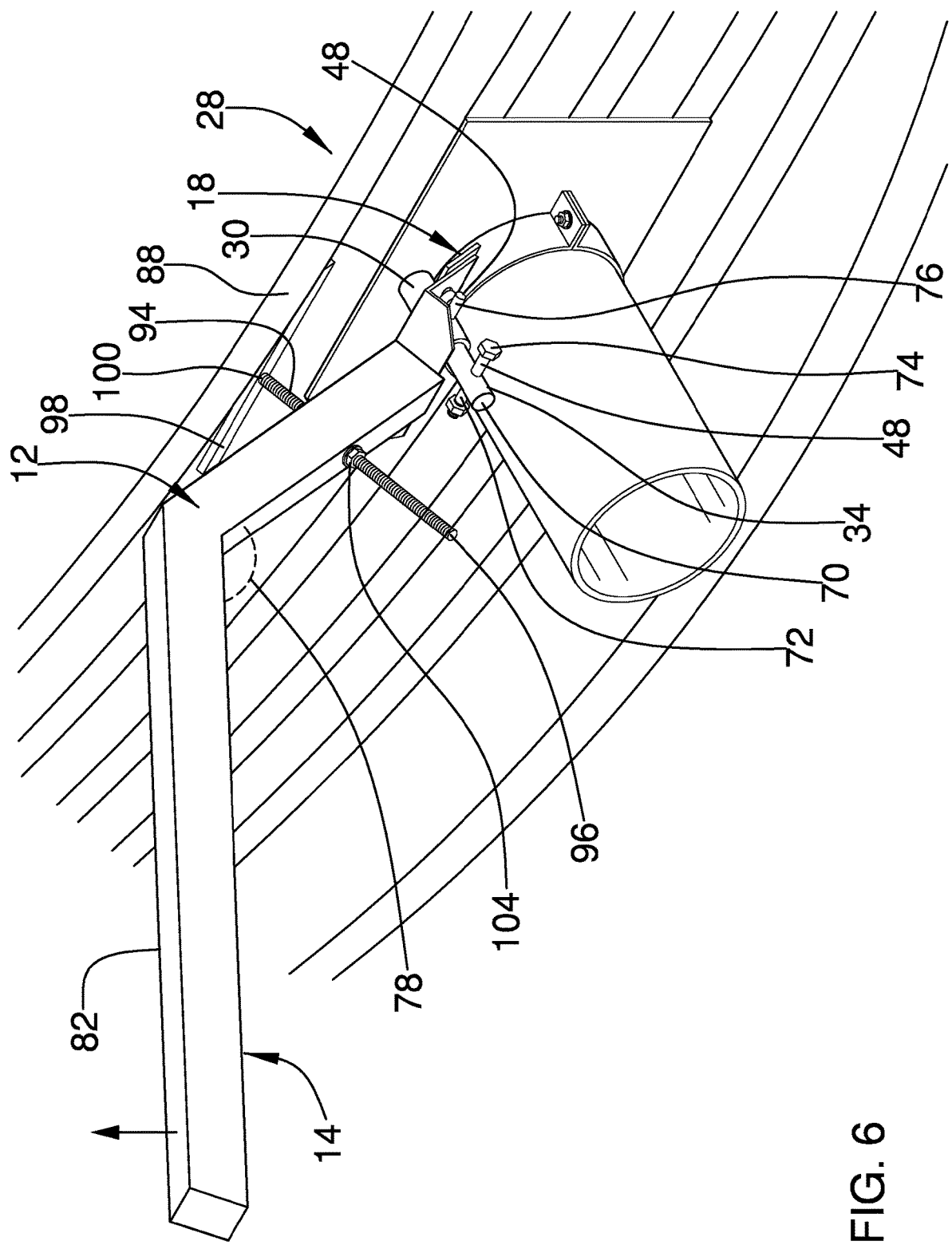
FIG. 6 is an in-use view of an embodiment of the disclosure.
Figure 7:
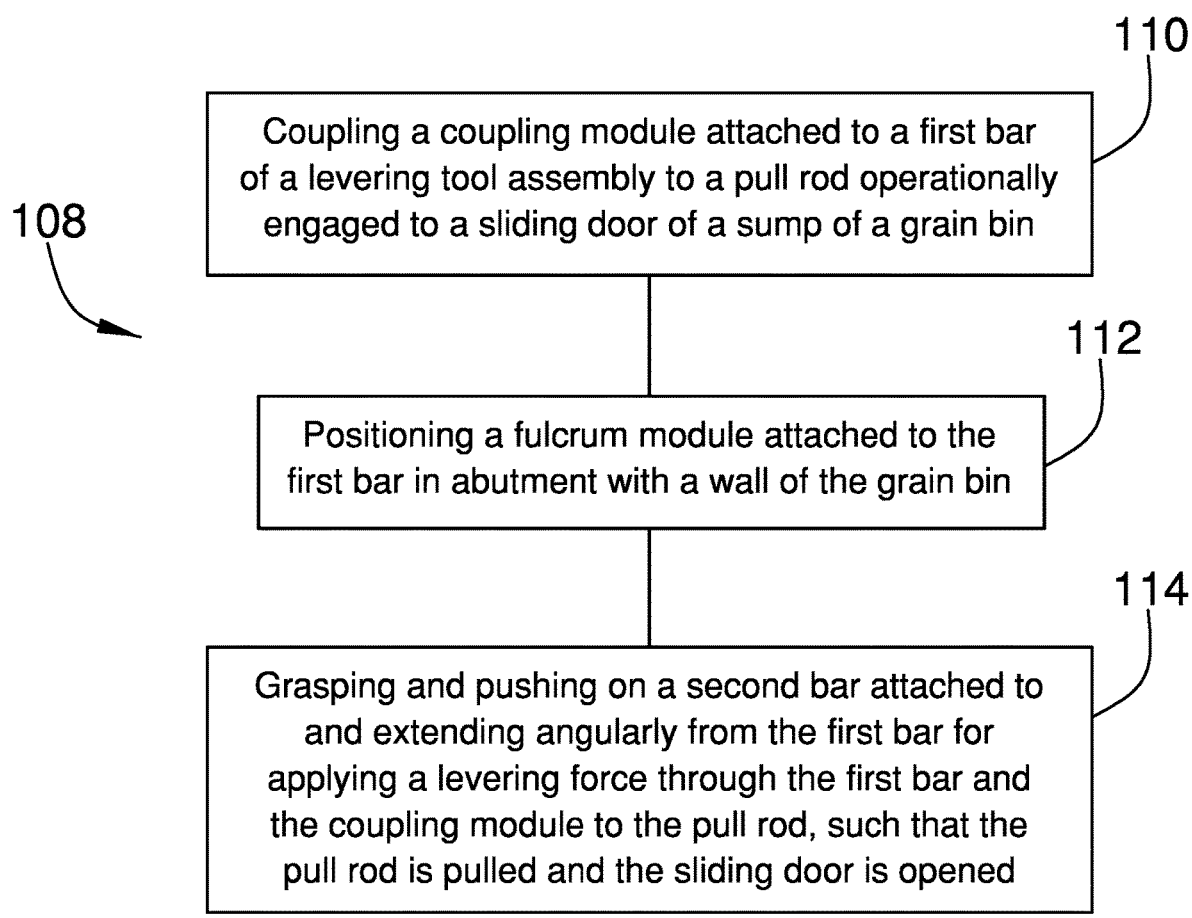
FIG. 7 is a flow diagram for a method utilizing an embodiment of the disclosure.

As shown in FIG. 6, the levering tool assembly 10 is positioned for application of a levering force to a secondary pull rod 30, which is configured as a pipe 32. A primary pull rod 34 is positioned within the pipe 32. With repositioning of the levering tool assembly 10 and adjustment to the fulcrum module 84, the levering tool assembly 10 would be positioned for application of the levering force to the primary pull rod 34. Pull rods 22 can readily be modified, if required, to be compatible with the levering tool assembly 10. For example, a primary pull rod 34 can be drilled and a through bolt 74 inserted. In another example, a sleeve 106 bearing two opposing pins 76 can be welded to a secondary pull rod 30.

In use, the levering tool assembly 10 enables a method of opening a sliding door of a sump of a grain bin 108. The method 108 comprises a first step 110 of coupling a coupling module 18 attached to a first bar 12 of the levering tool assembly 10 to a pull rod 22 that is operationally engaged to the sliding door 24. A second step 112 of the method 108 is positioning a fulcrum module 84, which is attached to the first bar 12, in abutment with a wall 88 of the grain bin 28. A third step 114 of the method 108 is grasping and pushing on a second bar 14, which is attached to and which extends angularly from the first bar 12, to apply a levering force through the first bar 12 and the coupling module 18 to the pull rod 22 so that the pull rod 22 is pulled and the sliding door 24 is opened.

With the coupling module 18 comprising a first plate 36 in which a cutout 40 is positioned, as described in the specification above, the step of coupling the coupling module 18 to the pull rod 22 comprises inserting the pull rod 22 into the cutout 40 so that each tab 46 abuts a respective element 48 extending opposingly from the pull rod 22.

With the coupling module 18 additionally comprising spacer plates 56, bolts 66, and wingnuts 68, as described in the specification above, the method 108 comprises the additional steps of centering the pull rod 22 within the cutout 40, sliding the spacer plates 56 to adjust an effective width 58 of the cutout 40 so that it substantially matches a diameter 70 of the pull rod 22, and tightening the wingnuts 68.

With the fulcrum module 84 configured as detailed in the specification above, the method 108 comprises an additional step of selectively positioning the elongate plate 98 relative to the first bar 12 so that, upon positioning the elongate plate 98 in abutment with the wall 88 of the grain bin 28 and pushing upon the second bar 14, the levering force is applied substantially longitudinally to the pull rod 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A levering tool assembly comprising:
   a first bar;
   a second bar extending angularly from a first end of the first bar;
   a coupling module attached to a second end of the first bar and being configured for selectively coupling to a pull rod operationally engaged to a sliding door of a sump of a grain bin;
   a fulcrum module attached to a bottom of the first bar between the first end and the second end, the fulcrum module being selectively extensible substantially perpendicularly from the first bar and opposingly to the second bar, such that the fulcrum module, the first bar, and the second bar are coplanar, wherein the coupling module is configured for coupling to the pull rod, wherein the fulcrum module is configured for positioning in abutment with a wall of the grain bin, and wherein the second bar is configured for being grasped and pushed upon by a user for applying a levering force to the pull rod, such that the pull rod is pulled and the sliding door is opened; and
   wherein the fulcrum module comprises
      a channel extending through the first bar,
      a tube attached to the bottom of the first bar and extending from the channel, the tube being internally threaded,
      a threaded rod threadedly inserted through the tube, such that an upper end of the threaded rod protrudes from a top of the first bar, and
      an elongate plate attached to a lower end of the threaded rod, such that the elongate plate is selectively positionable relative to the first bar by rotation of the threaded rod within the tube, wherein the elongate plate is configured for positioning in abutment with the wall of the grain bin.

2. The levering tool assembly of claim 1, wherein the second bar and the first bar comprise square tubing.

3. The levering tool assembly of claim 1, wherein the second bar extends from the first bar at an angle of from 120.0° to 160.0°.

4. The levering tool assembly of claim 3, wherein the second bar extends from the first bar at an angle of from 140.0° to 150.0°.

5. The levering tool assembly of claim 1, wherein the coupling module comprises:
   a first plate attached by a first edge to the second end and extending substantially linearly from the first bar, the first plate being dimensionally wider than the first bar; and
   a cutout extending into a second edge of the first plate and being positioned equally distant from opposed ends of the first plate, such that the cutout defines a pair of tabs, wherein the cutout is configured for insertion of the pull rod, such that each tab of the pair of tabs abuts a respective element of a pair of elements extending opposingly from the pull rod.

6. The levering tool assembly of claim 1, wherein the fulcrum module is biased toward the second end of the bar.

7. The levering tool assembly of claim 1, wherein the fulcrum module comprises:

a washer positioned around the threaded rod in abutment with the top of the first bar; and a nut threadedly positioned over the upper end of the threaded rod, wherein the nut is configured for selective tightening for preventing rotation of the threaded rod, such that the elongate plate is fixedly positioned relative to the first bar.

8. A levering tool assembly comprising:

a first bar;

a second bar extending angularly from a first end of the first bar;

a coupling module attached to a second end of the first bar and being configured for selectively coupling to a pull rod operationally engaged to a sliding door of a sump of a grain bin;

a fulcrum module attached to a bottom of the first bar between the first end and the second end, the fulcrum module being selectively extensible substantially perpendicularly from the first bar and opposingly to the second bar, such that the fulcrum module, the first bar, and the second bar are coplanar, wherein the coupling module is configured for coupling to the pull rod, wherein the fulcrum module is configured for positioning in abutment with a wall of the grain bin, and wherein the second bar is configured for being grasped and pushed upon by a user for applying a levering force to the pull rod, such that the pull rod is pulled and the sliding door is opened;

wherein the coupling module comprises
   a first plate attached by a first edge to the second end and extending substantially linearly from the first bar, the first plate being dimensionally wider than the first bar, and
   a cutout extending into a second edge of the first plate and being positioned equally distant from opposed ends of the first plate, such that the cutout defines a pair of tabs, wherein the cutout is configured for insertion of the pull rod, such that each tab of the pair of tabs abuts a respective element of a pair of elements extending opposingly from the pull rod; and
   a second plate attached to the first end of the first bar, the second plate extending from the bottom to a top of the first bar and substantially between opposed ends of the first plate, such that the second plate rigidifies the first plate.

9. The levering tool assembly of claim 8, wherein upper corners of the second plate are beveled.

10. A levering tool assembly comprising:

a first bar;

a second bar extending angularly from a first end of the first bar;

a coupling module attached to a second end of the first bar and being configured for selectively coupling to a pull rod operationally engaged to a sliding door of a sump of a grain bin;

a fulcrum module attached to a bottom of the first bar between the first end and the second end, the fulcrum module being selectively extensible substantially perpendicularly from the first bar and opposingly to the second bar, such that the fulcrum module, the first bar, and the second bar are coplanar, wherein the coupling module is configured for coupling to the pull rod, wherein the fulcrum module is configured for positioning in abutment with a wall of the grain bin, and wherein the second bar is configured for being grasped and pushed upon by a user for applying a levering force to the pull rod, such that the pull rod is pulled and the sliding door is opened;

wherein the coupling module comprises
   a first plate attached by a first edge to the second end and extending substantially linearly from the first bar, the first plate being dimensionally wider than the first bar, and
   a cutout extending into a second edge of the first plate and being positioned equally distant from opposed ends of the first plate, such that the cutout defines a pair of tabs, wherein the cutout is configured for insertion of the pull rod, such that each tab of the pair of tabs abuts a respective element of a pair of elements extending opposingly from the pull rod; and wherein the coupling module comprises
   a pair of spacer plates,
   a plurality of slots positioned singly in each tab of the pair of tabs and each spacer plate of the pair of spacer plates,
   a pair of bolts, each bolt of the pair of bolts being selectively insertable through a slot positioned in a respective spacer plate of the pair of spacer plates and a slot positioned in a respective tab of the pair of tabs, and
   a pair of wingnuts, each wingnut of the pair of wingnuts being selectively threadedly couplable to a respective bolt of the pair of bolts for securing the pair of spacer plates to the pair of tabs, such that an effective width of the cutout is adjustable by sliding of the spacer plates prior to tightening of the wingnuts, such that the effective width substantially matches a diameter of the pull rod.

11. A levering tool assembly comprising:

a first bar;

a second bar extending angularly from a first end of the first bar, the second bar and the first bar comprising square tubing, the second bar extending from the first bar at an angle of from 120.0° to 160.0°;

a coupling module attached to a second end of the first bar and being configured for selectively coupling to a pull rod operationally engaged to a sliding door of a sump of a grain bin, the coupling module comprising:
   a first plate attached by a first edge to the second end and extending substantially linearly from the first bar, the first plate being dimensionally wider than the first bar,
   a cutout extending into a second edge of the first plate and being positioned equally distant from opposed ends of the first plate, such that the cutout defines a pair of tabs, wherein the cutout is configured for insertion of the pull rod, such that each tab of the pair of tabs abuts a respective element of a pair of elements extending opposingly from the pull rod,
   a second plate attached to the first end of the first bar, the second plate extending from the bottom to a top of the first bar and substantially between opposed ends of the first plate, such that the second plate rigidifies the first plate, upper corners of the second plate being beveled,
   a pair of spacer plates,
   a plurality of slots positioned singly in each tab of the pair of tabs and each spacer plate of the pair of spacer plates,
   a pair of bolts, each bolt of the pair of bolts being selectively insertable through a slot positioned in a respective spacer plate of the pair of spacer plates and a slot positioned in a respective tab of the pair of tabs, and a pair of wingnuts, each wingnut of the pair of wingnuts being selectively threadedly couplable to a respective bolt of the pair of bolts for securing the pair of spacer plates to the pair of tabs, such that an effective width of the cutout is adjustable by sliding of the spacer plates prior to tightening of the wingnuts, such that the effective width substantially matches a diameter of the pull rod; and a fulcrum module attached to a bottom of the first bar between the first end and the second end, the fulcrum module being selectively extensible substantially perpendicularly from the first bar and opposingly to the second bar, such that the fulcrum module, the first bar, and the second bar are coplanar, wherein the coupling module is configured for coupling to the pull rod, wherein the fulcrum module is configured for positioning in abutment with a wall of the grain bin, and wherein the second bar is configured for being grasped and pushed upon by a user for applying a levering force to the pull rod, such that the pull rod is pulled and the sliding door is opened, the fulcrum module being biased toward the second end of the bar, the fulcrum module comprising:

a channel extending through the first bar, a tube attached to the bottom of the first bar and extending from the channel, the tube being internally threaded, a threaded rod threadedly inserted through the tube, such that an upper end of the threaded rod protrudes from the top of the first bar, an elongate plate attached to a lower end of the threaded rod, such that the elongate plate is selectively positionable relative to the first bar by rotation of the threaded rod within the tube, wherein the elongate plate is configured for positioning in abutment with the wall of the grain bin, a washer positioned around the threaded rod in abutment with the top of the first bar, and a nut threadedly positioned over the upper end of the threaded rod, wherein the nut is configured for selective tightening for preventing rotation of the threaded rod, such that the elongate plate is fixedly positioned relative to the first bar.

12. A method of opening a sliding door of a sump of a grain bin comprising the steps of:

coupling a coupling module attached to a first bar of a levering tool assembly to a pull rod operationally engaged to a sliding door of a sump of a grain bin;

positioning a fulcrum module attached to the first bar in abutment with a wall of the grain bin;

grasping and pushing on a second bar attached to and extending angularly from the first bar for applying a levering force through the first bar and the coupling module to the pull rod, such that the pull rod is pulled and the sliding door is opened;

the fulcrum module comprising:

a channel extending through the first bar, a tube attached to the bottom of the first bar and extending from the channel, the tube being internally threaded, a threaded rod threadedly inserted through the tube, such that an upper end of the threaded rod protrudes from the top of the first bar, and an elongate plate attached to a lower end of the threaded rod, such that the elongate plate is selectively positionable relative to the first bar by rotation of the threaded rod within the tube, wherein the elongate plate is configured for positioning in abutment with the wall of the grain bin; and the method comprising an additional step of selectively positioning the elongate plate relative to the first bar so that, upon positioning the elongate plate in abutment with the wall of the grain bin and pushing upon the second bar, the levering force is applied substantially longitudinally to the pull rod.

13. The method of claim 12, further including:

the coupling module comprising:

a first plate attached by a first edge to the second end and extending substantially linearly from the first bar, the first plate being dimensionally wider than the first bar, and a cutout extending into a second edge of the first plate and being positioned equally distant from opposed ends of the first plate, such that the cutout defines a pair of tabs; and the step of coupling the coupling module to the pull rod comprising insertion of the pull rod into the cutout, such that each tab of the pair of tabs abuts a respective element of a pair of elements extending opposingly from the pull rod.

14. A method of opening a sliding door of a sump of a grain bin comprising the steps of:

coupling a coupling module attached to a first bar of a levering tool assembly to a pull rod operationally engaged to a sliding door of a sump of a grain bin;

positioning a fulcrum module attached to the first bar in abutment with a wall of the grain bin;

grasping and pushing on a second bar attached to and extending angularly from the first bar for applying a levering force through the first bar and the coupling module to the pull rod, such that the pull rod is pulled and the sliding door is opened;

the coupling module comprising:

a first plate attached by a first edge to the second end and extending substantially linearly from the first bar, the first plate being dimensionally wider than the first bar, and a cutout extending into a second edge of the first plate and being positioned equally distant from opposed ends of the first plate, such that the cutout defines a pair of tabs; and the step of coupling the coupling module to the pull rod comprising insertion of the pull rod into the cutout, such that each tab of the pair of tabs abuts a respective element of a pair of elements extending opposingly from the pull rod;

the coupling module comprising:

a pair of spacer plates, a plurality of slots positioned singly in each tab of the pair of tabs and each spacer plate of the pair of spacer plates, a pair of bolts, each bolt of the pair of bolts being selectively insertable through a slot positioned in a respective spacer plate of the pair of spacer plates and a slot positioned in a respective tab of the pair of tabs, and a pair of wingnuts, each wingnut of the pair of wingnuts being selectively threadedly couplable to a respective bolt of the pair of bolts for securing the pair of spacer plates to the pair of tabs, such that an effective width of the cutout is adjustable by sliding of the spacer plates prior to tightening of the wingnuts, such that the effective width substantially matches a diameter of the pull rod; and the method comprising the additional steps of:
  centering the pull rod within the cutout,
  sliding the spacer plates to adjust an effective width of the cutout so that it substantially matches a diameter of the pull rod, and
  tightening the wingnuts.

* * * * *